(12) United States Patent
Schwerk

(10) Patent No.: US 8,671,391 B2
(45) Date of Patent: Mar. 11, 2014

(54) COMPONENT MODEL FOR ANALYTIC APPLICATIONS SUPPORTING PARAMETERIZATION

(75) Inventor: Uwe Schwerk, Heidelberg (DE)

(73) Assignee: SAP AG, Walldorf (DE)

( * ) Notice: Subject to any disclaimer, the term of this patent is extended or adjusted under 35 U.S.C. 154(b) by 240 days.

(21) Appl. No.: 12/962,583

(22) Filed: Dec. 7, 2010

(65) Prior Publication Data

US 2012/0144368 A1 Jun. 7, 2012

(51) Int. Cl.
*G06F 9/44* (2006.01)

(52) U.S. Cl.
USPC .......................................... 717/120; 717/121

(58) Field of Classification Search
USPC ................................................. 717/120, 121
See application file for complete search history.

(56) References Cited

U.S. PATENT DOCUMENTS

| | | | | |
|---|---|---|---|---|
| 6,976,015 B2 * | 12/2005 | Kumar et al. | ................. | 707/714 |
| 7,519,600 B1 * | 4/2009 | Zenz | ...................................... | 1/1 |
| 7,620,642 B2 * | 11/2009 | Zurek et al. | ........................... | 1/1 |
| 7,720,803 B2 * | 5/2010 | Unnebrink et al. | ........... | 707/601 |
| 7,814,044 B2 * | 10/2010 | Schwerk | ....................... | 707/600 |
| 7,991,731 B2 * | 8/2011 | Schwerk | ....................... | 707/600 |
| 8,091,071 B2 * | 1/2012 | Tsantilis | ....................... | 717/120 |
| 8,214,321 B2 * | 7/2012 | Schmitt | ........................ | 707/600 |
| 8,266,123 B2 * | 9/2012 | Dill et al. | ...................... | 707/702 |
| 2005/0120051 A1 * | 6/2005 | Danner et al. | ............. | 707/104.1 |
| 2006/0031775 A1 * | 2/2006 | Sattler et al. | .................. | 715/769 |
| 2007/0162435 A1 * | 7/2007 | Hadari et al. | ..................... | 707/4 |
| 2008/0189438 A1 * | 8/2008 | Zimmerer et al. | ............ | 709/246 |
| 2009/0132612 A1 * | 5/2009 | Bruening et al. | ............. | 707/203 |
| 2010/0169267 A1 * | 7/2010 | John et al. | ..................... | 707/605 |
| 2011/0093487 A1 * | 4/2011 | Le Biannic et al. | ........... | 707/765 |

* cited by examiner

*Primary Examiner* — Don Wong
*Assistant Examiner* — Theodore Hebert
(74) *Attorney, Agent, or Firm* — Mintz Levin Cohn Ferris Glovsky and Popeo, P.C.

(57) ABSTRACT

In an aspect there is provided a method. The method may include defining an application to include at least one component, the at least one component including at least one parameter; executing the application, wherein the at least one parameter receives a value to enable the application to produce data, wherein the at least one parameter is received from at least one of another component, a user interface, or another program; and providing the produced data to a user interface. Related apparatus, systems, techniques, and articles are also described.

17 Claims, 8 Drawing Sheets

100

130 Data Structure

| City | Country | Sales person | Product | Quantity | Profit |
|---|---|---|---|---|---|
| Frankfurt | DE | Klaus | Product 1 | 700 | 5799 |
| Frankfurt | DE | Heidi | Product 2 | 200 | 1986 |
| Frankfurt | DE | Uwe | Product 3 | 300 | 3456 |
| Frankfurt | DE | Frank | Product 4 | 1000 | 9000 |
| Frankfurt | DE | Karin | Product 1 | 200 | 3456 |
| Mainz | DE | Maria | Product 1 | 300 | 7890 |
| San Diego | US | Hans | Product 2 | 500 | 3456 |

212A, 212B, 212C, 212D (CHARACTERISTICS 211); 212E, 212F (Key Figures 221)

Parameters: | Year | 1999 | (201)

FIG. 2A

COMPONENT MODEL FOR ANALYTIC APPLICATIONS SUPPORTING PARAMETERIZATION

TECHNICAL FIELD

The subject matter described herein relates to components used to build analytic applications.

BACKGROUND

Analytic applications typically use abstractions, shortened records, or other aggregate forms of transactional business data. Business data may include key figure data, which may include data that can be aggregated using an appropriate function. For example, sales totals for a particular time period can be summed or a minimum (or maximum) daily sales total can be calculated. In another example, pricing information can be extracted from larger, transactional data structures and then stored in a more efficient aggregate table for reporting and analysis. In some instances, new key figure data can be derived from existing key figure data by, for example, a calculation (e.g., calculating a margin based on a purchase process) or a restriction (e.g., determine open sales given a restriction of sales data to sales orders with a status of "in progress"). Semantically related key figures may also be grouped, thus forming a key figure structure.

Moreover, key figure data may be grouped by one or more items of information, in which case the grouping can be referred to as characteristic data. For example, sales totals can be grouped by sales person, sales region, product, etc., and aggregated sales totals can be calculated for each characteristic grouping. Analytic applications may include key figure data and characteristic data, both of which may be used during reporting and analysis of the underlying data.

SUMMARY

In one aspect, there is provided a method. The method may included defining an application to include at least one component, the at least one component including at least one parameter, executing the application, wherein the at least one parameter receives a value to enable the application to produce data, wherein the at least one parameter is received from at least one of another component, a user interlace, or another program; and providing the produced data to a user interface.

Articles of manufacture are also described that comprise machine executable instructions permanently stored on machine readable media (e.g., non-transitory computer readable media), which, when executed by a machine, causes the machine to perform the operations described herein. Similarly, computer systems are also described that may include a processor and a memory coupled to the processor. The memory may temporarily or permanently store one or more programs that cause the processor to perform one or more of the operations described herein.

In some implementations, one or more of the features described herein including one or more of the following may be included in the method, system, and/or articles of manufacture described herein. The application may comprise an analytic application configured to analyze multidimensional data stored in a multidimensional database storing data in at least one of a star structure and a snowflake structure. The at least one component may embed another component, wherein the another component includes at least other parameter defined at run time. A repository may store the at least one component and may be configured to enable the analytical application to select from a plurality of components. The application may comprise an analytical application including a plurality of components configured to model a calculated key figure, a restricted key figure, and a key figure structure. The at least one component may comprises a set of code providing a function called via an application programming interface to enable access to the at least one parameter of the at least one component. The at least one parameter may be defined to include a name, a result type, and a processing type.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIGS. 2A-2B depicts an example of a data structure including key figures and characteristics;

Like reference symbols in the various drawings indicate like elements.

DETAILED DESCRIPTION

Figure 1:
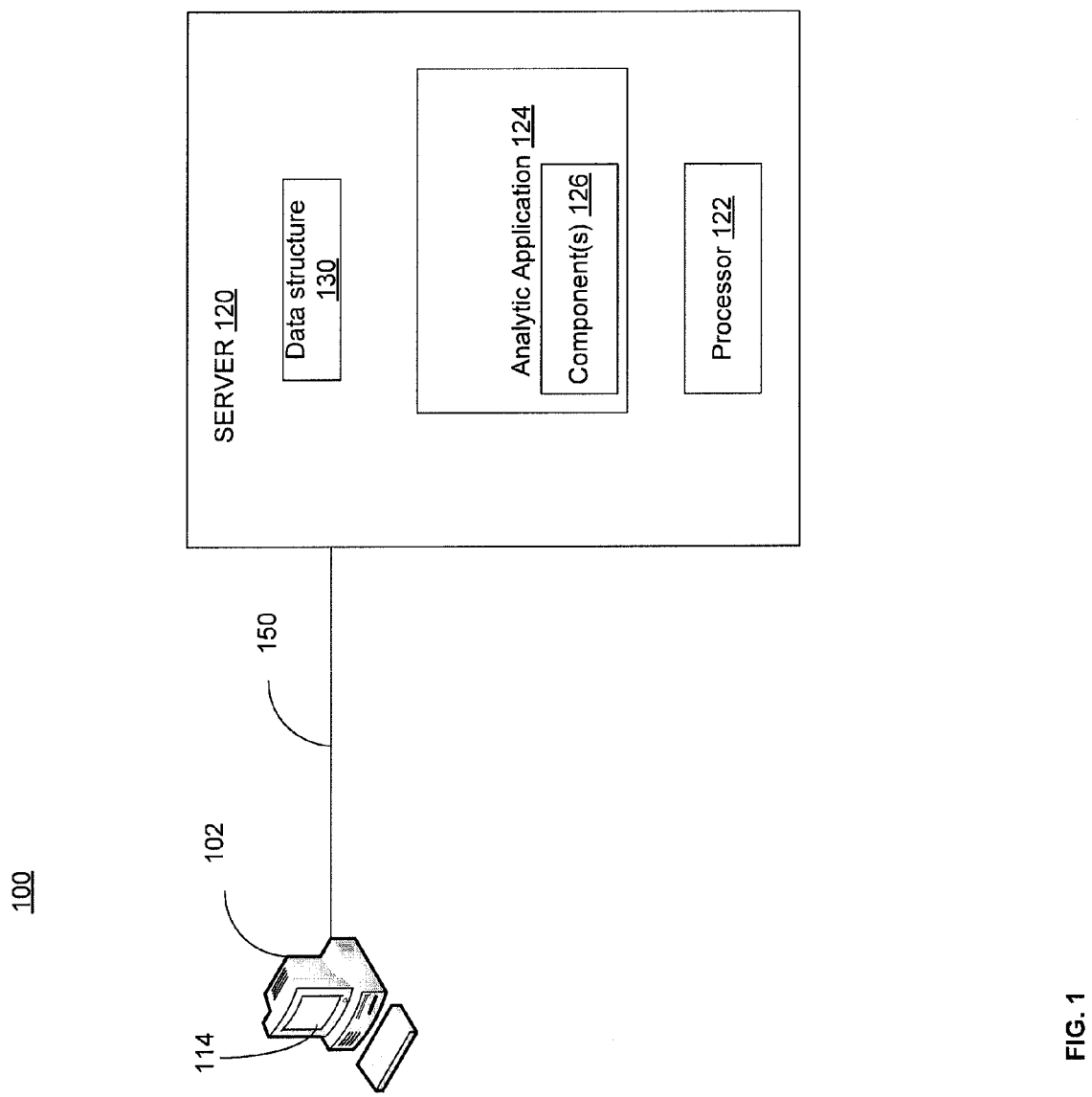
FIG. 1 depicts an example of a system including a computer and a server including an analytic application including one or more components.

Analytic applications are becoming increasingly complex and, as a consequence, reusable components (which adhere to a given component model or definition) may be used to facilitate the building of these analytic applications. Examples of such components include calculated key figures, restricted key figures, and key figure structures. The component may be built, such that the component includes at least one parameter providing a placeholder for a value determined only at run time. For example, at least one of the parameters may be provided at the run time of the analytic application via a user interface and/or one of the parameters provided at run time programmatically. For the latter, the component may include a set of code (e.g., executable instructions for performing a task/function called via an application programming interface to enable access to the parameters of the component). One or more components may be combined to build (e.g., form, compose, generate, etc.) an analytic application which, when processed, enables determining data, such as key figure data and characteristic data. To further illustrate by example, at the run time of an analytic application, a user may be prompted at a user interface to provide parameters for components of the analytic application. The parameters configure the components and thus the analytic application including those components.

In some implementations, the component is re-useable (e.g., the component may be reused in different analytic applications), which may enhance flexibility when building analytic applications. By using parameters in a component, the reusability may be, in some implementations, increased considerably. For example, a calculated key figure component calculating an amount of profit may be reused for subsidiaries in different countries if the currency is provided at run time as a parameter.

The component may also be embedded in another component, enabling the other component to have access to the parameters of the embedded component. Specifically, the embedding component may have read access to parameters and have write access to parameters of type user input. In this regard, write access means that the value of the parameter can be provided upon embedding, i.e. at design time when the analytic application is assembled from components. For example, if a user input parameter is provided with a value during embedding at design time, the user input parameter will not be presented for user input at the startup of the analytic application.

When a component is embedded ("the embedded component") so that it can be used by another component ("the embedding component"), the parameters of the embedded component may be reused in the embedding component. For example, a parameter of a calculated key figure component (e.g., a parameter representing a currency) can be reused by a key figure structure component embedding this calculated key figure component, so that at run time the currency parameter is used in both the calculated embedded key figure component and the embedding key figure structure component.

To further illustrate, the parameters of a component may be characterized by a name, a label, a result type (e.g., a text, a number, a member selection for a specific characteristic, and the like), and/or a processing type (e.g., whether the processing is via a user input and/or programmatically). At the start of the analytic application and given a processing type of "user input," the parameter value is determined via user input on the generated parameter screen, as depicted at for example FIGS. 4 and 5A, unless the parameter value has been specified upon embedding at design time as noted above. For processing type "programmatically," the value of the parameter is determined by, for example, running the set of code attached to the component.

The component may, as noted, include a set of code, such as a coding breakout. The set of code may have read access to all parameters of the component itself, and additionally write access to all parameters of the component having a processing type of programmatically, providing thus the component with a specific function. For example, the code set may provide a function that reads the value of a user input parameter containing a company name and reads the corresponding default currency for the company to provide a value for a parameter representing a currency to be used in the component of the analytic application.

FIG. 1 depicts a system 100 including a computer 102 and a server 120, which are coupled by a communication mechanism 150, such as the Internet, an intranet, and the like. The computer 102 (e.g., a laptop, a personal computer, a mobile wireless device, and the like) may include a user interface 114. The server 120 may further include a processor 122, an analytic application 124, and a data structure 130. The analytic application 124 may further include at least one component 126 formed as described herein.

The computer 102 may include at least one processor and at least one memory (which may include code and/or data). The computer 102 may be configured to connect and/or communicate with server 120 via communication mechanism 150. The user interface 114 may be implemented as any type of interface that enables interaction with aspects of system 100. For example, the user interface 114 may be implemented as a browser, a client application, and the like.

The communication mechanism 150 may be any type of wired and/or wireless mechanism and may include, alone or in any suitable combination, the Internet, a telephony-based network, a local area network (LAN), a wide area network (WAN), a dedicated intranet, a wireless LAN, an intranet, a wireless network, a bus, a connection, and/or any other communication mechanism.

The server 120 may include at least one processor, such as processor 122 and at least one memory (which may include code and/or data). The at least one memory may be implemented as any type of storage mechanism including random access memory, read only memory, FLASH memory, optical disks, and/or any other mechanism for storing data. For example, the server 120 may be implemented as one or more of the following: a computing device, a computer, a blade server, and/or any other suitable processing device.

The server 120 may execute analytic application 124 including the at least one component 126. The analytic application 124 may obtain data from a data source, such as for example a multidimensional database including multidimensional data stored in a star and/or snowflake schema. The obtained data is analyzed by the analytical application 124 including the at least one component 126 to produce data structure 130, which is presented at user interface 114. The at least one component 126 may thus be used to model one or more aspects of the data structure 130 (e.g., a key figure, a calculated key figure, a restricted key figure, a key figure structure, and a characteristic) and obtain, at runtime either programmatically or via a user interface, a value for at least one parameter of the component. The analyzed data may, in some implementations, be associated with a business transaction. For example, the business transaction may be associated with sales, pricing, inventory, sales orders, and the like. The analytic application 124 including at least one component 126 thus provides analysis, presentation, and/or reporting of the data structure 130, which is presented to a user as a page at user interlace 114.

The data structure 130 is generated by the analytic application 124 which is formed from the one or more parameterized components 126. The data structure 130 may include transactional data being analyzed, presented, and/or reported. For example, transactional data may include sales data, pricing changes, sales orders, financial transactions, or any other business transactional data. The data structure 130 may also include key figures, characteristics, and aggregated data, which may be generated based on transactional data. For example, the aggregated data may include one or more key figures, which can store an aggregated data value associated with a group of data.

FIG. 2A depicts at 130 an example of data structure 130 presented to a user at user interface 114. The columns 212A-D may be classified as characteristic columns 211, and columns 212E-F may be classified as key figure columns 221. The components described herein may be used to model one or more aspects of the key figures and/or characteristics. Although data structure 130 depicts data stored in the rows and columns, the data may be organized in structures other rows and columns as well.

The key figures columns 212E-F may include quantifiable values that can be aggregated using a function, such as a sum, a minimum value, a maximum value, an average value, a count function, and the like. The values in the key figures columns 212E-F may include numeric values, and the numeric values may be aggregated. The values of the key figures columns may include a variety of other data types as well including a type of date. In the example of FIG. 2A, the key figures correspond to quantity 212E and profit 212F, although other types of key figures may be used as well.

The components 126 described herein may be modeled (e.g., configured, defined, etc.), so that at run time of an analytic application 124, parameters are provided to the component 126. For example, a first component may be defined at design time to calculate a currency value on a given date for a currency value used in a key figure and a second component may be defined at design time to calculate profit across a given date range. In this example, the second component may include the embedded, first component for calculating currency. And, at run time of analytic application 124, at least one parameter may be provided to each component either via a user interface or programmatically (e.g., using a code set or another component).

The characteristics columns 212 A-D represent classifications of the key figures columns. Specifically, the characteristic columns 212A-D may represent groupings (e.g., categories, subcategories, etc.) by which data (e.g., the rows) in data structure 130 is analyzed (e.g., sorted, grouped, and the like). In the example of FIG. 2A, the data structure 130 may be sorted by city 212A, country 212B, sales person 212C, product 212D, although these are merely examples as other characteristics may be used as well.

Figure 2B:
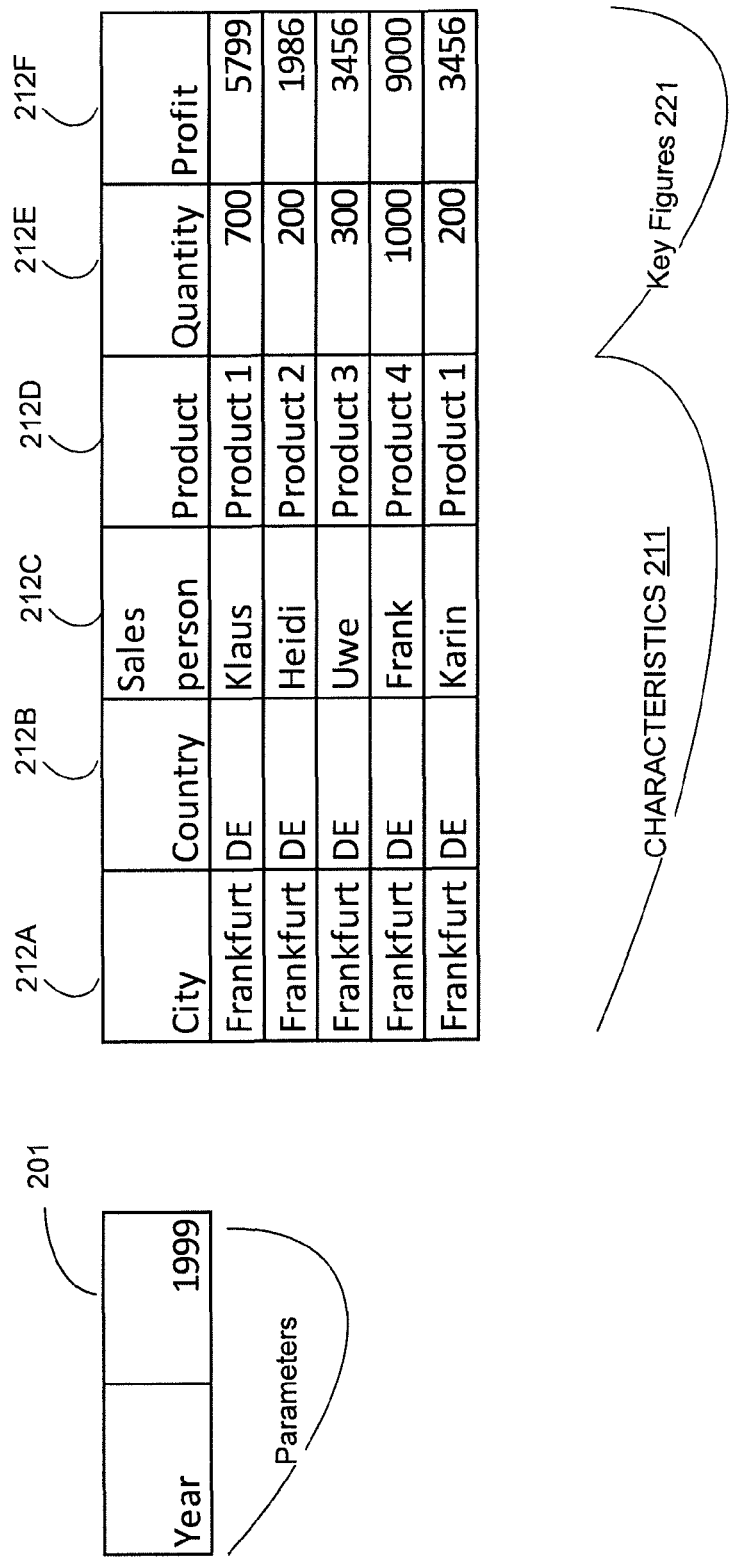

The data structure 130 may be sorted during an analysis by, for example, analytic application 124. FIG. 2B depicts another example of data structure 130. Data structure 130 depicts data structure 130 after a sort based on the characteristic city 212A being "Frankfurt." For example, a user at user interface 114 may select the characteristic city 212A "Frankfurt," causing an analysis of data structure 130 by analytic application 124 and the resulting data structure 130. The profit 212E may be calculated at run time according to one or more parameters of the components associated with a profit calculation for the key figure for profit 212F. Returning to the example above, a first component may be used to calculate a currency value on a given date (e.g., the value of a Euro on a given date). In this example, the currency type Euro may be provided, at run time, to a component for the key figure for profit 212F, enabling the component to proceed with the key figure calculation for profit 212F. As noted, the subject matter described herein relates to using one or more components to model (e.g., define) a key figure of the data structure and/or the characteristics to be used. The analytic application 124 may be formed based on these one or more components. As noted, at design time, a component may be defined with one or more parameters and/or code. At the run time of the analytic application 124 using the component 126, one or more values for the parameters of the component may be provided by a user interface (e.g., by a user), by another component (the embedding component), and/or programmatically.

Figure 3:
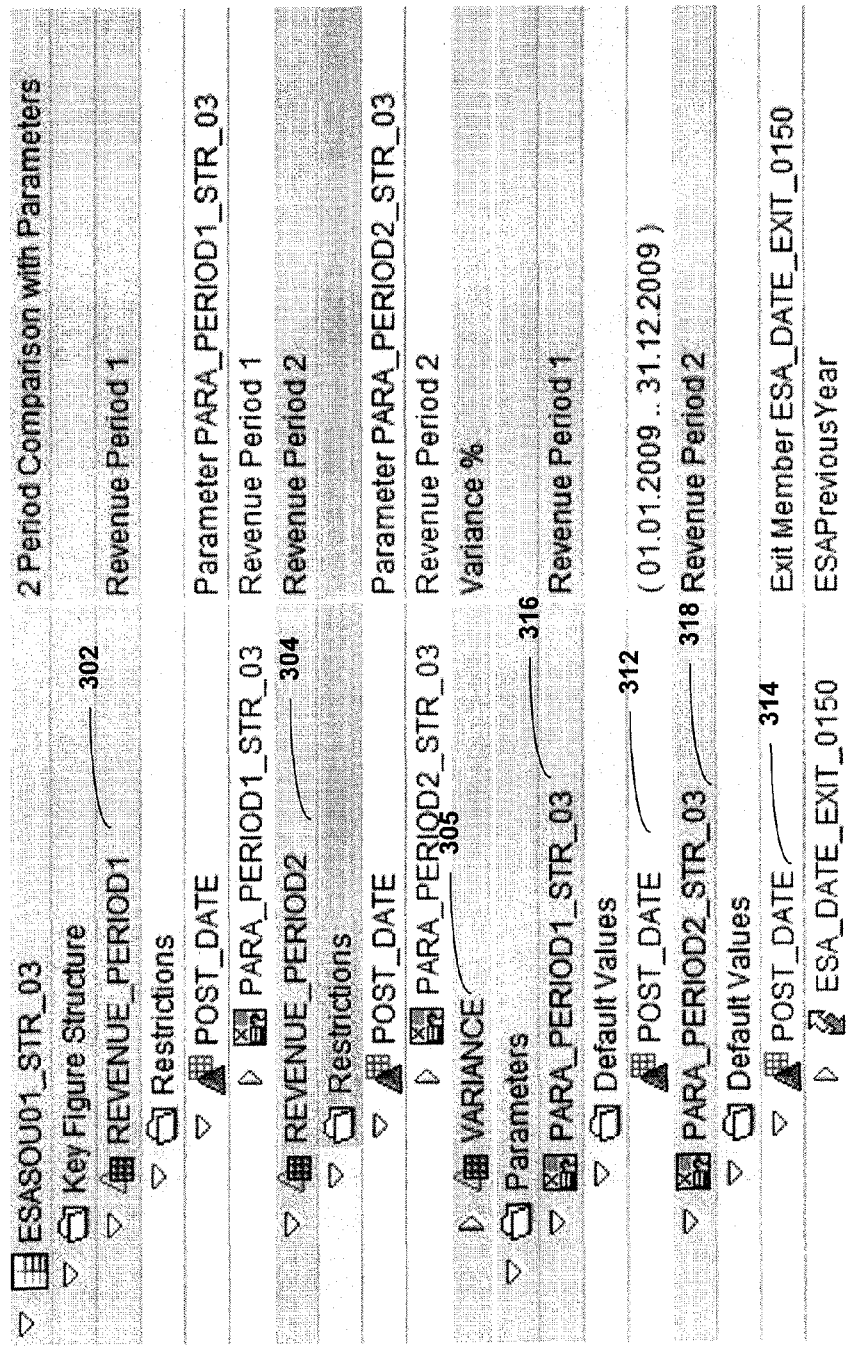
FIG. 3 depicts an example of a component defining a key figure structure having three key figures.

FIG. 3 depicts a component 126 modeling (e.g., defining) a key figure structure at design time. The first two key FIGS. 302 and 304 show the revenue restricted to a certain post date period and a comparison period, respectively. The post date periods are determined via parameters filled via user input at run time and having certain default values. The third key FIG. 305 calculates the variance of the $1^{st}$ and $2^{nd}$ key figures.

The key figure structure at FIG. 3 includes two key FIGS. 302 and 304 derived by restricting the key figure revenue to certain periods of the characteristic post date. The corresponding periods for post date are obtained from the values of parameters PARA_PERIOD1_STR_03 316 and PARA_PERIOD2_STR_03 318 defined in component 126. Moreover, the component 126 may define default values for these parameters 312 and 314.

Figure 4:
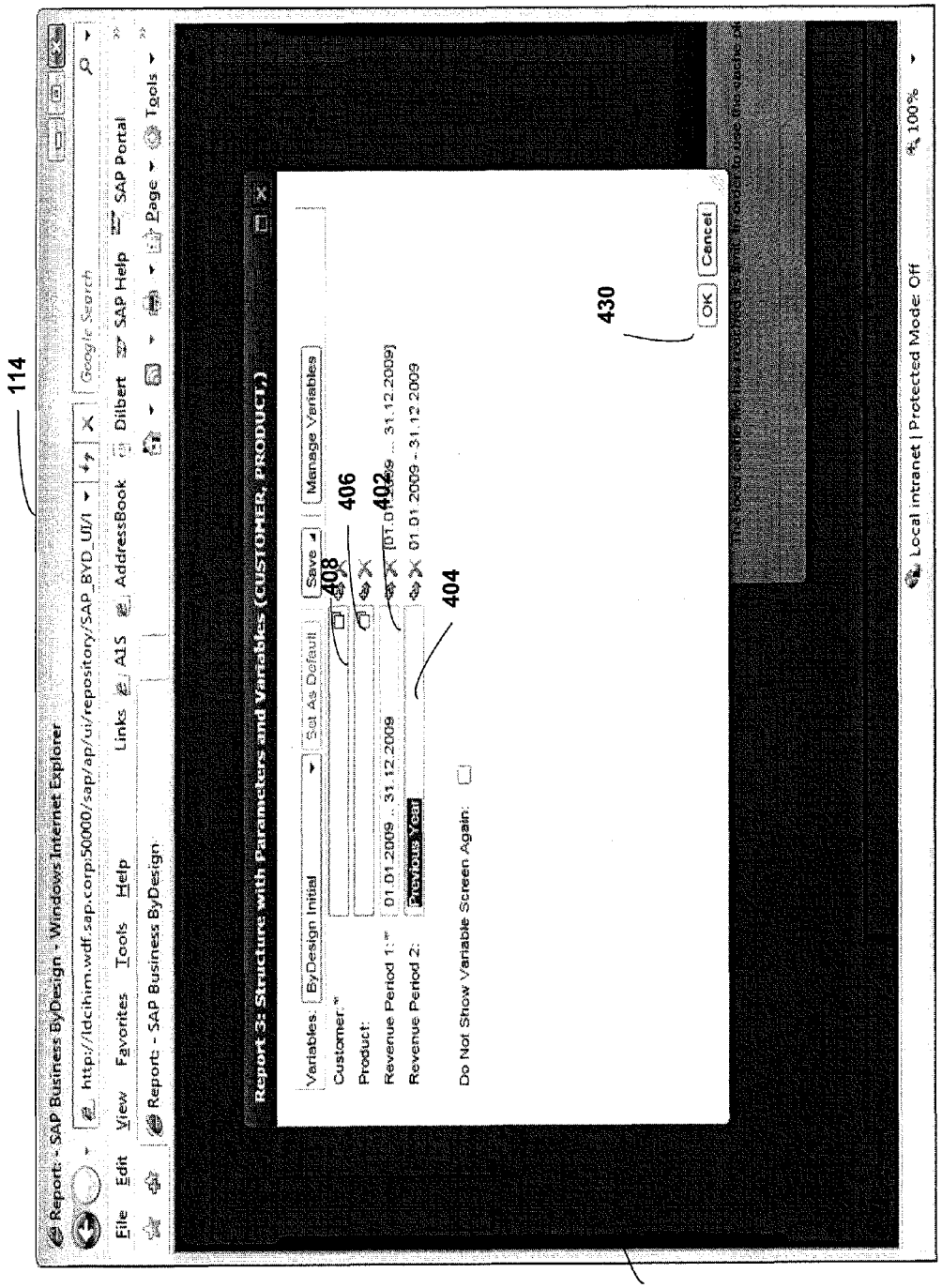
FIG. 4 depicts an example of a page prompting a user for input of parameters of the analytic application being executed/started.

FIG. 4 depicts a page 400 presented at user interlace 114 at run time. The analytic application 124 is formed based on the key figure structure component depicted in FIG. 3 (which thus includes parameters for revenue period 1 and revenue period 2). The page 400 enables user interface 114 to provide parameters values for at least the parameters defined at FIG. 3. Specifically, user interface 114 may be used to provide parameters values for the first and second revenue periods 402 and 404 as well as other variables, such as customer 408 and product 406. The latter coming from the parameters of other components included in the analytic application 124. For example, a user may type in the values Jan. 1, 2009 to Dec. 31, 2009 at 402 and the value Previous Year at 404. Once the "OK" user interface element 430 is selected, the user interface 400 provides those parameter values to the component 126, at which time the analytic application 124 analyzes the data based on the component and the run time parameter values and generates the data structure at, for example, FIG. 5A.

Figure 5A:
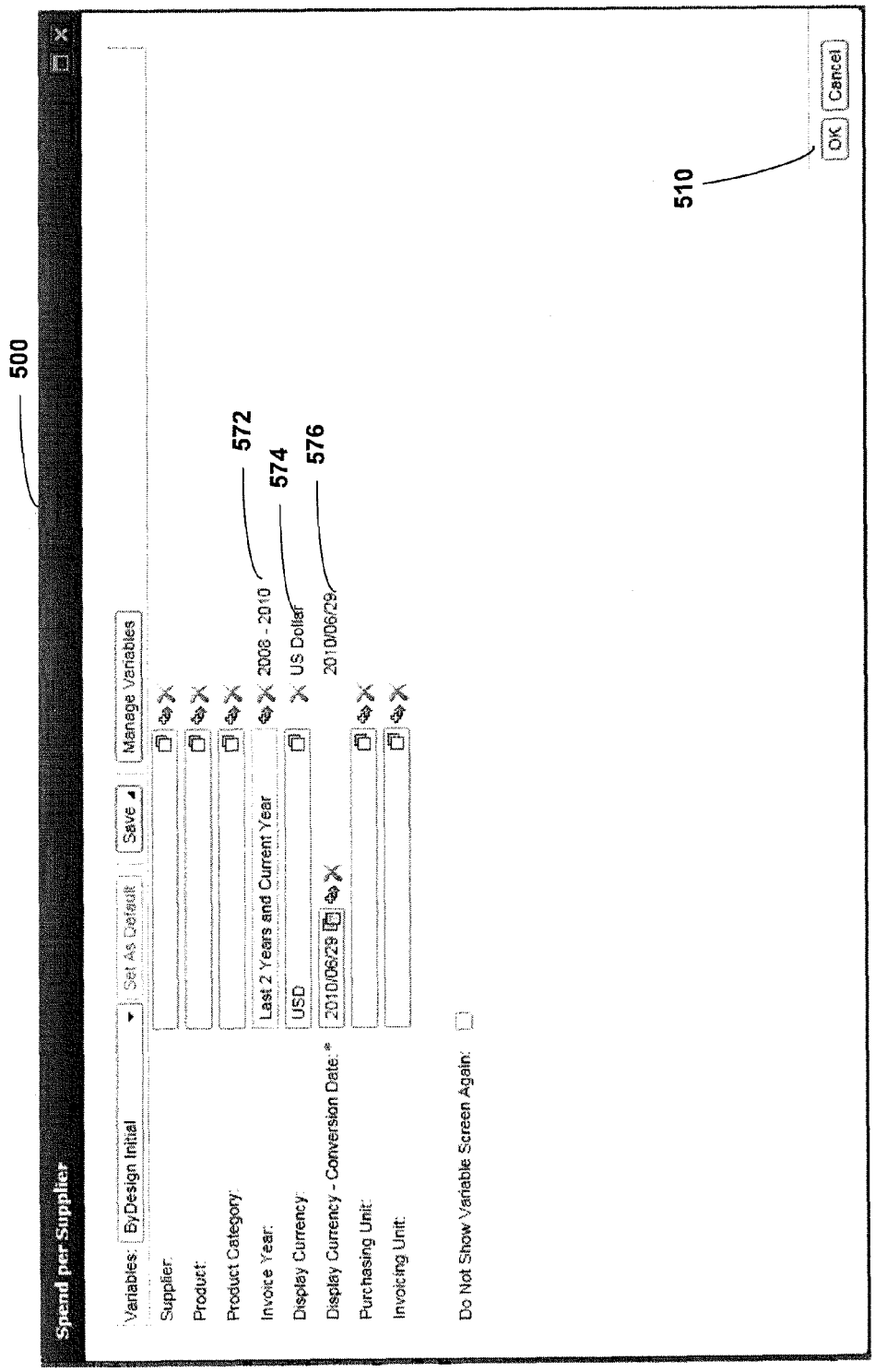
FIG. 5A depicts another example of a page prompting a user for parameter inputs.

FIG. 5A depicts another page 500 presented at user interface 114 at run time. Page 500 is similar to page 400 but includes different examples of parameters. In the example of FIG. 5A, the following parameters are provided: an invoice year 572 (e.g., last 2 years and current year), a currency 574, a date 576 for use to determine the currency conversion, and so forth as depicted at FIG. 5A. Those parameters are provided at run time to a key figure structure component, such as for example component 126, or other components which are used in the analytic application 124 so that when the okay 510 is selected, the processing of the analytic application 124 leads to page 550 at FIG. 5B.

Figure 5B:
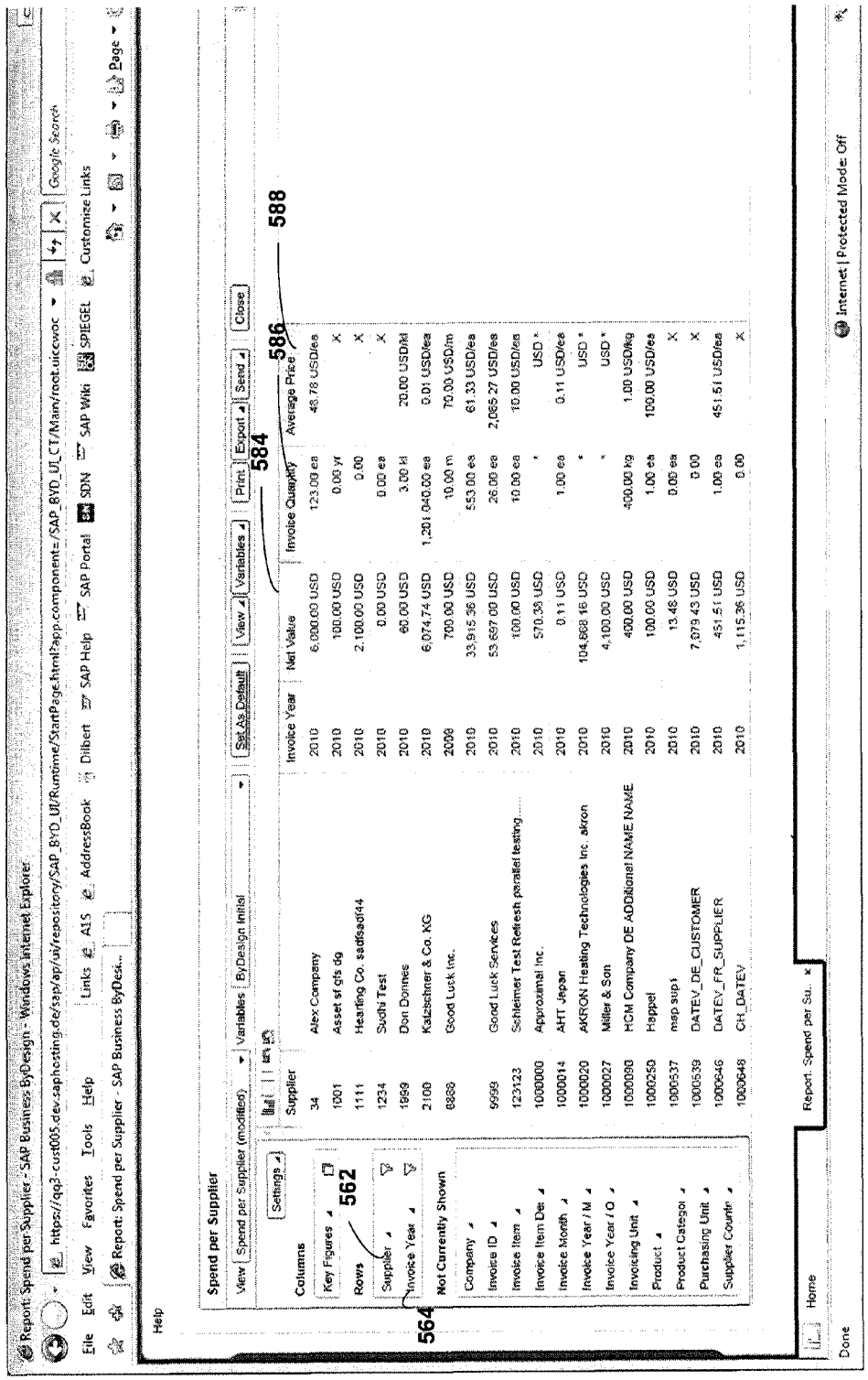
FIG. 5B depicts a data structure analyzed based on the same analytic application used in FIG. 5A.

FIG. 5B depicts page 550, which depicts a data structure analyzed based on the component and the parameters provided at run time (e.g., via FIG. 5A). The page 550 includes a key figure structure including key figures net value 584 in U.S. Dollars, invoice quantity 586, and average price 588. In this example, the key figure structure embeds a component representing net value 584, which receives, from the user interface at run time, the currency parameter and a date parameter to enable a determination of net value in Dollars. The key figures are listed for each combination of values for the characteristics "Supplier" 562 and "Invoice Year" 564 that comply with the user input of 500 (FIG. 5A, e.g. for Invoice Year 2008-2010 572).

Figure 6:
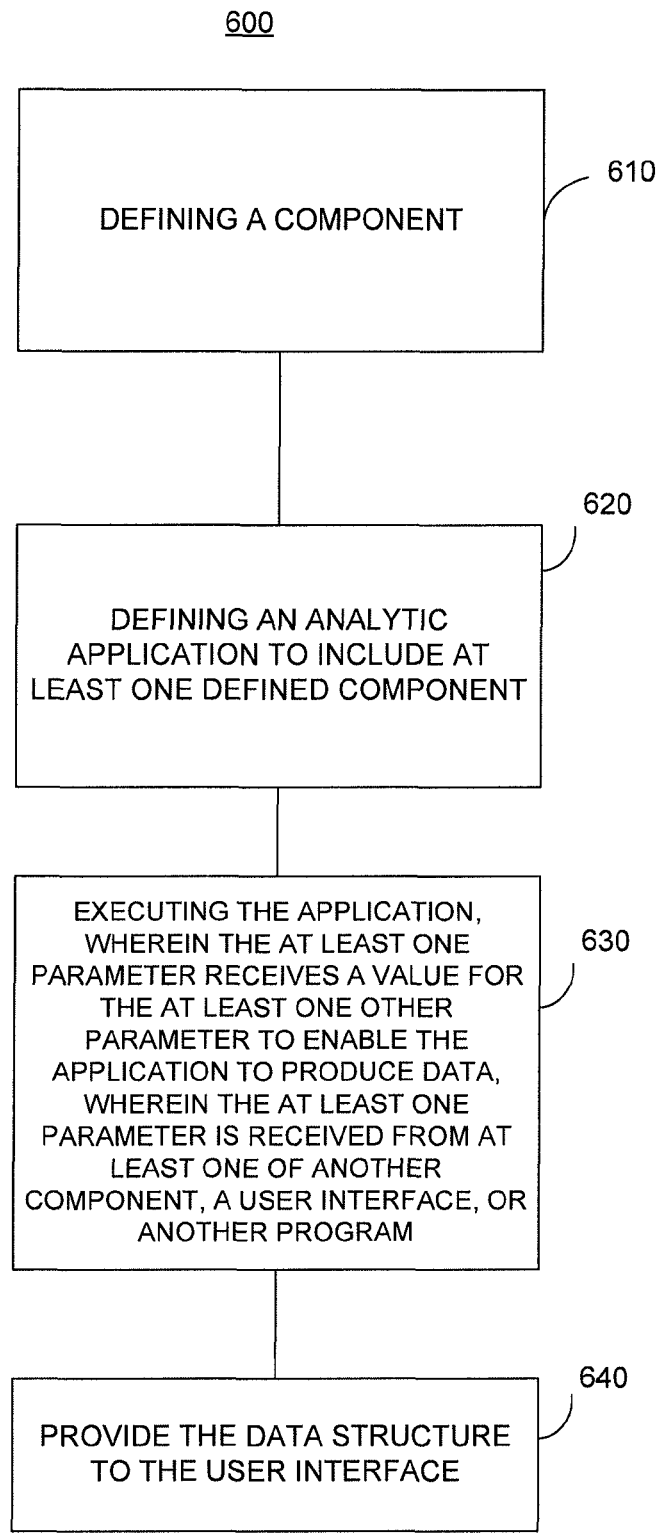
FIG. 6 depicts an example process for generating a component including parameters.

FIG. 6 depicts a process 600 for using components, such a component 126.

At 610, a component may be defined. The defined component may be defined at design time to include at least one parameter. The at least one parameter serves as a place holder for a value that is determined at the run time of the analytic application 124 which includes the defined component 126. The value of the at least parameter may be determined at run time, either programmatically, via a user interface, and/or via another component. For example, a component 126 may be defined as depicted at FIG. 3.

At 620, an application, such as analytic application 124, may be defined to include at least one of the components defined at 610. The analytic application including the component 126 provide at run time an analyzed data structure as depicted at FIG. 5B. Moreover, the plurality of components may be selected from a repository storing existing components to enable forming the analytic application. For example, the component for a key figure structure may be formed based on the key figures and characteristics of the multidimensional data source and/or by embedding another reusable component, such as components representing restricted or calculated key figures. At design time, parameters may also defined to receive values later at run time by a user and/or programmatically. The parameters may also be used to restrict key figures. For example, when doing a sales analysis comparing the current month with some month in the past, a key figure component representing sales numbers might be restricted to a certain month using a parameter. Thus, the comparison month can be chosen by the user at the start of the analytic application 124.

At 630, at least one parameter is received at run time for the defined component. When this is the case, the application is run (e.g., executed). The at least one parameter receives a value to enable the application to produce data. The at least one parameter is received from at least one of another component, a user interface, or another program. For example, the at least one component 126 (which can be executed/started) represents an analytic application 124. By executing/starting the component(s), the run time is invoked. The run time at server 120 analyzes the analytic application 124 and any corresponding components 126, assembles the information for the parameters to be presented at user interlace 114 based on the defined parameters of the components 126, launches the parameters page (see, e.g., FIGS. 4 and 5A), processes user input(s) for these parameters, and performs the corresponding data analysis (e.g., data selection, restriction, calculations, analytics, reporting, and the like) to generate the analytical data structure 130 presented to the user, as depicted at FIG. 5B. The analytic application analyzes the data, which is then provided at 640 to a user interface for presentation.

Referring again to FIG. 4, at the run time of analytic application 124, a page, such as pages 400 or 500, may be presented at user interface 114. The page may allow a user to enter values for a parameter of component 126. As noted above with respect to FIG. 4, a user may type in the values Jan. 1, 2009 to Dec. 31, 2009 at 402 and the value Previous Year at 404. Once OK 430 is selected, the user interface provides those parameter values to the component 126, at which time the analytic application 124 analyzes the data structure 130 based on the component and run time parameter values.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications, or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

Although a few variations have been described in detail above, other modifications are possible. For example, while the descriptions of specific implementations of the current subject matter discuss analytic applications, the current subject matter is applicable to other types of software and data services access as well. Moreover, although the above description makes references to specific products, other products may be used as well. The term set includes zero or more elements. Furthermore, although the above refers to design time and run time, in some implementations, the activities associated with design time and run time may occur at any other time as well. In addition, the logic flows depicted in the accompanying figures and described herein do not require the particular order shown, or sequential order, to achieve desirable results. Other embodiments may be within the scope of the following claims.

What is claimed:

1. A non-transitory machine-readable storage medium including code which when executed by a machine provides operations comprising:

defining an application to include at least one first component, wherein
the at least one first component defines a first key figure, includes at least one first parameter, and embeds at least one second component for use by the at least one first component,
the at least one second component defines a second key figure and includes at least one second parameter having a value assigned to the at least one second component at design time and received at run time,
the first component having access to the at least one second parameter,
the first and second key figures form a restricted key figure structure for producing data during execution of the application, the second key figure includes at least one of a calculated key figure and a restricted key figure;
wherein the data is produced by the at least one first component and the at least one second component based on the received value of the at least one first parameter and the received value of the at least one second parameter, the data produced by the at least one first component is restricted by the at least one second parameter;

executing the application, wherein the at least one first parameter receives a value to enable the application to produce data, wherein the at least one first parameter value is received from at least one of another component, a user interface, or another program; and providing the produced data to a user interface.

2. The non-transitory machine-readable storage medium of claim 1, wherein the application comprises an analytic application configured to analyze multidimensional data stored in a multidimensional database, the multidimensional database storing data in at least one of a star structure and a snowflake structure.

3. The non-transitory machine-readable storage medium of claim 1, wherein a repository stores the at least one first component and the at least one second component, the repository configured to enable the analytical application to select from a plurality of components.

4. The non-transitory machine-readable storage medium of claim 1, wherein the application comprises an analytical application including a plurality of components configured to model a calculated key figure, a restricted key figure, and a key figure structure.

5. The non-transitory machine-readable storage medium of claim 1, wherein the at least one component comprises a set of code providing a function called via an application programming interface to enable access to the at least one first parameter of the at least one first component and the at least one second parameter of the at least one second component.

6. The non-transitory machine-readable storage medium of claim 1, wherein the at least one first parameter and the at least one second parameter are defined to include a name, a result type, and a processing type.

7. A method comprising:

defining an application to include at least one first component, wherein the at least one first component defines a first key figure, includes at least one first parameter, and embeds at least one second component for use by the at least one first component, the at least one second component defines a second key figure and includes at least one second parameter having a value assigned to the at least one second component at design time and received at run time, the first component having access to the at least one second parameter, the first and second key figures form a restricted key figure structure for producing data during execution of the application, the second key figure includes at least one of a calculated key figure and a restricted key figure;

wherein the data is produced by the at least one first component and the at least one second component based on the received value of the at least one first parameter and the received value of the at least one second parameter, the data produced by the at least one first component is restricted by the at least one second parameter;

executing the application, wherein the at least one first parameter receives a value to enable the application to produce data, wherein the at least one first parameter value is received from at least one of another component, a user interface, or another program; and providing the produced data to a user interface.

8. The method of claim 7, wherein the application comprises an analytic application configured to analyze multidimensional data stored in a multidimensional database, the multidimensional database storing data in at least one of a star structure and a snowflake structure, wherein at least one of the defining, the receiving, and the providing are implemented by at least one processor.

9. The method of claim 7, wherein a repository stores the at least one first component and the at least one second component, the repository configured to enable the analytical application to select from a plurality of components.

10. The method of claim 7, wherein the application comprises an analytical application including a plurality of components configured to model a calculated key figure, a restricted key figure and a key figure structure.

11. The method of claim 7, wherein the at least one first and second components comprise a set of code providing a function called via an application programming interface to enable access to the at least one first parameter of the at least one first component and the at least one second parameter of the at least one second component.

12. The method of claim 7, wherein the at least one first parameter and the at least one second parameter are defined to include a name, a result type, and a processing type.

13. A system comprising:

at least one processor; and at least one memory including code, which when executed causes operations comprising:

defining an application to include at least one first component, wherein the at least one first component defines a first key figure, includes at least one first parameter and embeds at least one second component for use by the at least one first component, the at least one second component defines a second key figure and includes at least one second parameter having a value assigned to the at least one second component at design time and received at run time, the first component having access to the at least one second parameter, the first and second key figures form a restricted key figure structure for producing data during execution of the application, the second key figure includes at least one of a calculated key figure and a restricted key figure;

wherein the data is produced by the at least one first component and the at least one second component based on the received value of the at least one first parameter and the received value of the at least one second parameter, the data produced by the at least one first component is restricted by the at least one second parameter;

executing the application, wherein the at least one first parameter receives a value to enable the application to produce data, wherein the at least one first parameter value is received from at least one of another component, a user interface, or another program; and providing the produced data to a user interface.

14. The system of claim 13, wherein the application comprises an analytic application configured to analyze multidimensional data stored in a multidimensional database, the multidimensional database storing data in at least one of a star structure and a snowflake structure.

15. The system of claim 13, wherein a repository stores the at least one first component and the at least one second component, the repository configured to enable the analytical application to select from a plurality of components.

16. The system of claim 13, wherein the application comprises an analytical application including a plurality of components configured to model a calculated key figure, a restricted key figure and a key figure structure.

17. The system of claim 13, wherein the at least one first and second components comprise a set of code providing a function called via an application programming interface to enable access to the at least one first parameter of the at least one first component and the at least one second parameter of the at least one second component.

* * * * *